United States Patent

Curtis

[15] 3,649,768

[45] Mar. 14, 1972

[54] HIGH CAPACITY SWITCHING NETWORK AND CONTROL ARRANGEMENT

[72] Inventor: Robert Bartlett Curtis, Columbus, Ohio

[73] Assignee: Bell Telephone Laboratories, Incorporated, Murray Hill, N.J.

[22] Filed: July 1, 1970

[21] Appl. No.: 51,571

[52] U.S. Cl. ....................179/22

[51] Int. Cl. ....................H04q 3/495

[58] Field of Search ....................179/22

[56] References Cited

UNITED STATES PATENTS 3,417,206 12/1968 Wakabayashi et al. ....................179/22

*Primary Examiner*—Kathleen H. Claffy
*Assistant Examiner*—Thomas W. Brown
*Attorney*—R. J. Guenther and James Warren Falk

[57] ABSTRACT

A five-stage switching network comprising incoming link frames (2-stages), midswitch frames (1-stage), and outlink frames (2-stages) is provided wherein the incoming and midswitch frames are arranged in subgroups with junctor access only between stages within the same subgroup but with junctor access from each subgroup to all outlink frames. The common control marker circuits are arranged to serve specified subgroups of incoming and midswitch frames and for this purpose a connector arrangement is provided wherein the markers and frames are arranged in a matrix with a connector relay at each point of intersection in the matrix. The connector arrangement between the markers and the outlink frames involves the use of a 2-stage connector wherein the midswitch frames contain connector relays for the control paths to the outlink frames. Thus, it is possible for all markers to obtain control of an outlink frame by first obtaining control of a midswitch frame. An extremely large capacity switching network is thereby provided employing minimal connector apparatus.

12 Claims, 11 Drawing Figures

INVENTOR
R.B. CURTIS
BY Brendan A. Ward
ATTORNEY

HIGH CAPACITY SWITCHING NETWORK AND CONTROL ARRANGEMENT

BACKGROUND OF THE INVENTION

1. Field of the Invention

This invention relates generally to common control switching systems comprising switching networks having serially related switching stages. More particularly, this invention relates to arrangements of such systems for increasing switching network capacity.

2. Description of the Prior Art

It is well known in switching system network arrangements that network capacity may be increased by the provision of additional switching stages. In modern switching systems, a design objective in expanding network capacity in this manner is to retain a single overall communication path hunt by the common control equipment. This design objective is fulfilled by providing access between the common control equipment and each of the switching stages. However, as the number of stages are increased, correspondingly larger connectors are required to permit interconnection of each of the common control circuits, such as markers, with the respective switching stages. It is, of course, obvious that the single overall communication path selection function could be divided between separate common control circuits. However, such circuits are inherently expensive. Thus, this procedure is generally not followed, since the cost would exceed that of providing the larger connectors. Therefore, as a practical matter, the provision of additional switching stages to increase network capacity is limited by the economic feasibility of the respective connectors thereby dictated. Accordingly, a need exists in the art for a switching network arrangement which will permit the provision of additional switching stages while retaining a single overall communication path hunt, but which does not require extremely large connectors to permit access between the common control equipment and the network switching stages.

It has been observed that the need for additional network capacity is most often manifested in switching networks which are in service. In view of the fact that such networks terminate large numbers of active line circuits and trunk circuits, the feasibility of increasing network capacity by the provision of additional switching stages is rendered more difficult by the requirement that large numbers of such circuits not be placed in an out-of-service condition during the transition period. Therefore, a need also exists in the art for an arrangement for increasing switching network capacity which meets the requirements hereinbefore set forth, but which is also readily implemented in existing switching systems on an in-service basis.

SUMMARY OF THE INVENTION

In the embodiment, an automatic telephone switching system is described which includes a 5-stage crossbar switching network. The first stage provides terminations for the various line circuits and incoming trunk circuits in the well-known manner while the fifth stage provides terminations for the various outgoing toll trunk circuits connecting to other offices. The intermediate three-stages constitute the principle distribution stages of the network.

The first and second stage switches are placed upon incoming link frames. The third stage is mounted on midswitch frames and the remaining two stages of switches are placed upon outgoing link frames. The incoming and midswitch frames are divided into subgroups with junctor access only between incoming and midswitch frames within the same subgroup. Junctor access is provided from each subgroup of incoming and midswitch frames to all outgoing link frames. The common control marker circuits, which perform the path hunt function through the network, are also divided into subgroups with each subgroup specifically assigned to serve respective subgroups of incoming link and midswitch frames.

The connector arrangement between the markers and incoming link frames is of the conventional type wherein the markers and incoming link frames are arranged in a matrix with a connector relay at each point of intersection in the matrix. The connector arrangement between the markers and midswitch frames is also of the conventional matrix type. However, the control arrangement between the markers and the outgoing link frames involves the use of a 2-stage connector wherein the midswitch frames contain connector relays for the control paths to the outgoing link frames. Thus, it is possible for all markers to obtain control of the outgoing link switch frames by first obtaining control of a midswitch frame.

Accordingly, all of the paths from a specific input terminal on one side of the network to a specific output terminal on the other side of the network are concentrated in relatively few switching frames, thereby permitting the common control equipment to test all associated paths by obtaining control of a minimal number of frames. In addition, the use of the 2-stage connector wherein the first stage is the same connector that provides access to the midswitch frame substantially reduces connector size thereby resulting in maximum economy.

In accordance with one feature of my invention a common control switching system is provided with a large capacity switching network comprising 5-network stages, wherein all of the network paths from a specific input terminal on one side of the network to a specific output terminal on the other side of the network are concentrated in a minimal number of switching frames.

In accordance with another feature of my invention a switching network is provided wherein certain of the switching stages are divided into subgroups with junctor access only between stages within the same subgroup and which subgroups are provided with junctor access to all of the remaining stages in the network.

It is another feature of my invention that a large capacity switching network arranged as aforesaid is provided wherein the common control circuits are divided into groups with each group arranged to serve a predetermined subgroup of switching stages.

It is another feature of my invention that selection of a network path is accomplished by common control equipment through the use of a 2-stage connector wherein the first stage of the connector provides access to an intermediate switching stage while simultaneously providing access to other switching stages.

BRIEF DESCRIPTION OF THE DRAWING

The foregoing and other objects, features, and advantages of my invention will be more apparent from the following description of the drawing in which.

Figure 7:
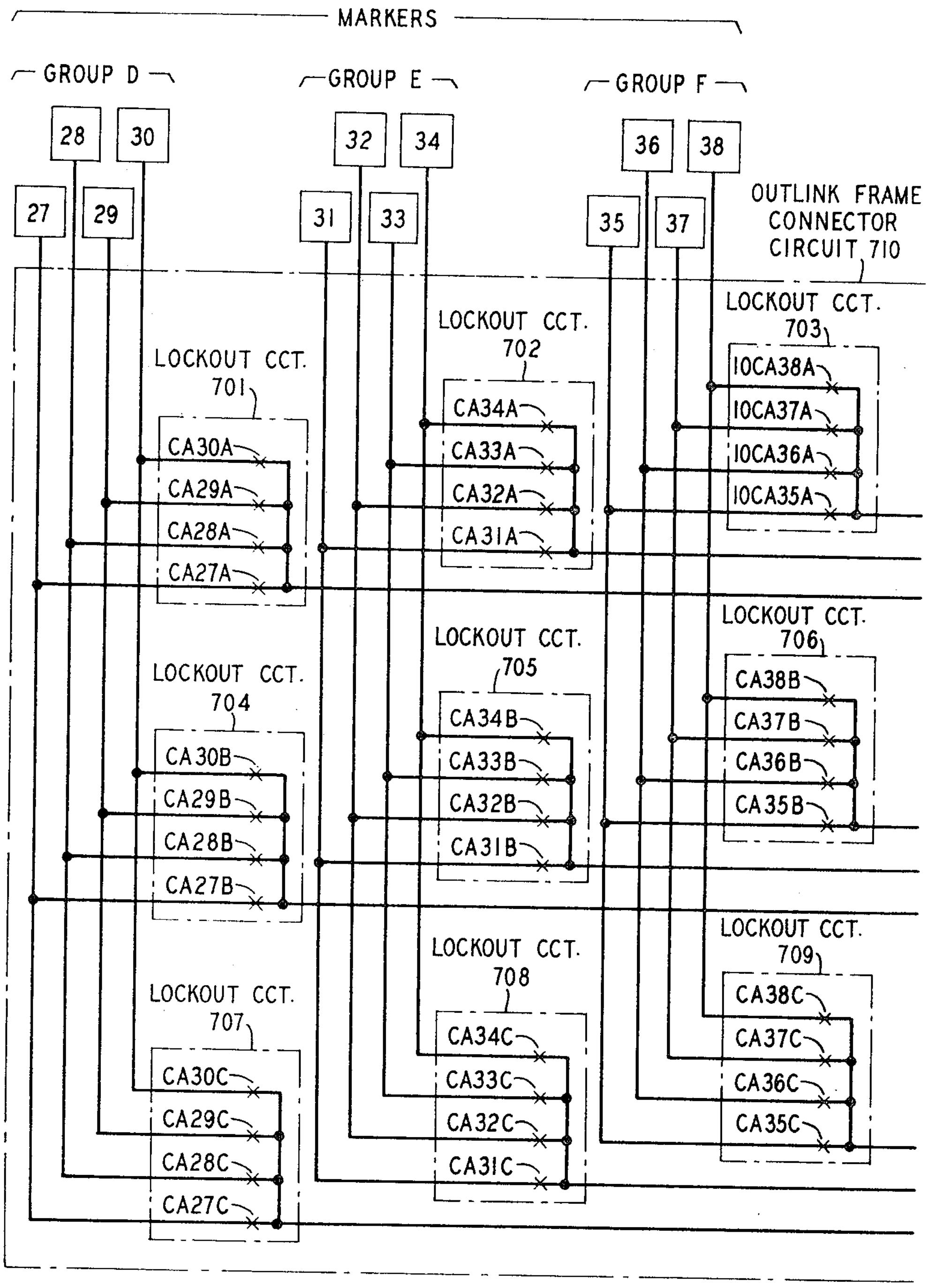
FIGS. 7 and 8 show in more detail the 2-stage connector arrangement between the respective marker circuits and the outlink frames of the embodiment.
Figure 9:
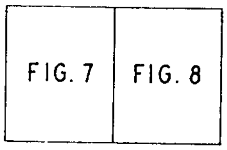
Figure 8:
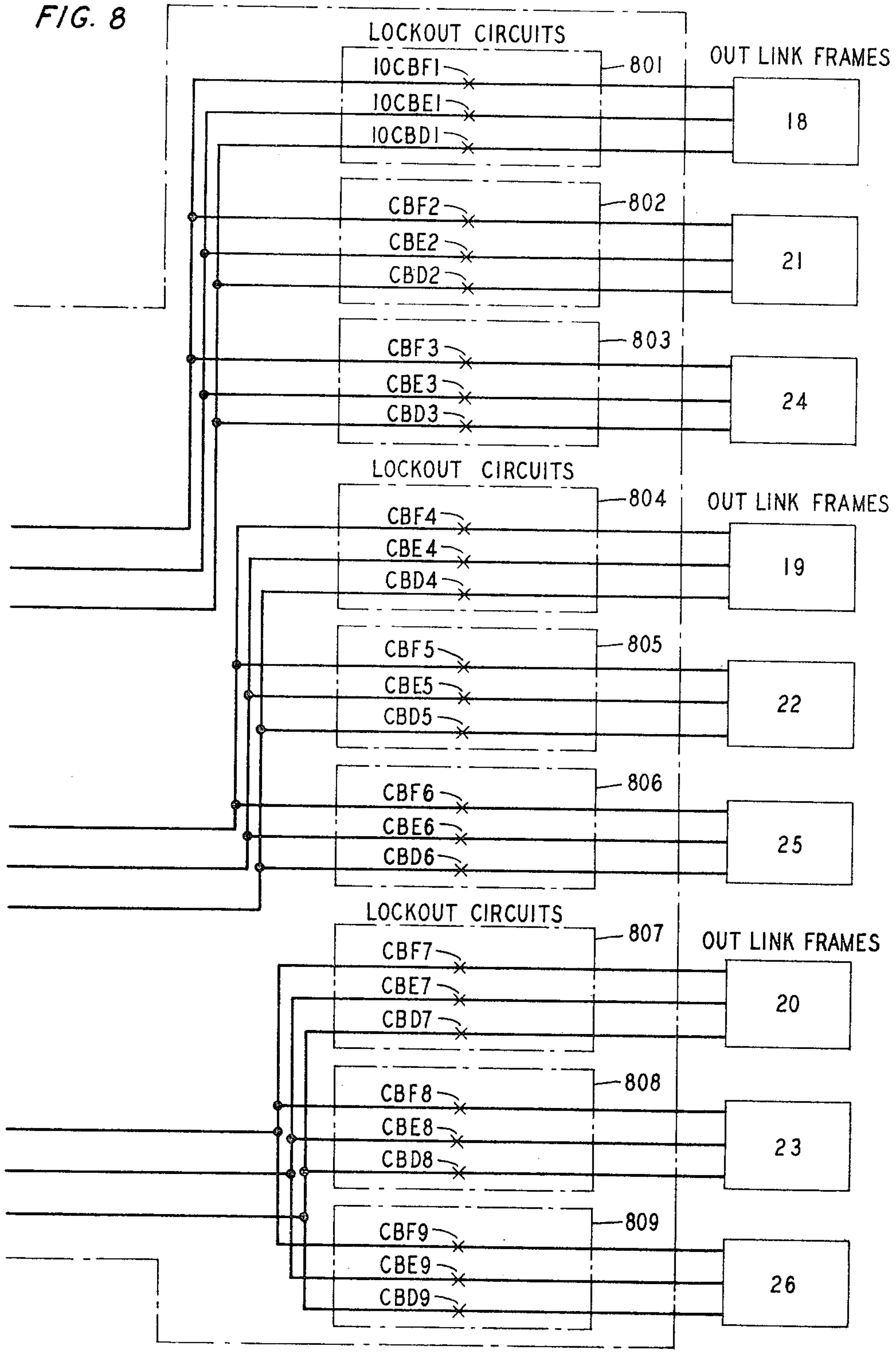
Figure 10:
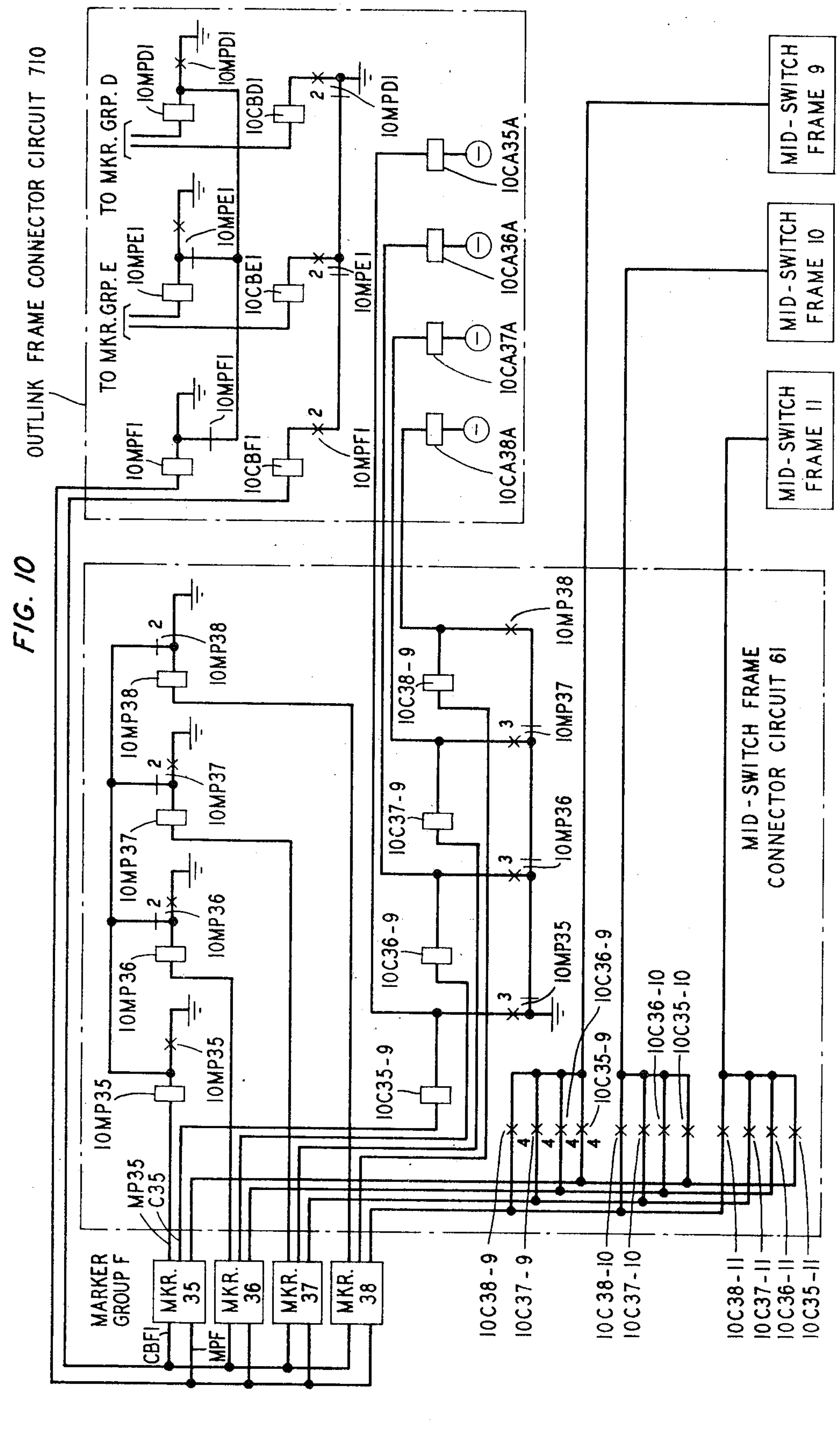
FIG. 10 shows in more detail the control circuitry associated with the midswitch frame connector circuit and the outlink frame connector circuit of the embodiment.

It will be noted that FIGS. 7, 8, and 10 employ a type of notation referred to as "detached-contact" in which an "X," shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the Sept. 1955 publication of the *American Institute of Electrical Engineers Transactions, Communications and Electronics*, Volume 74, pages 505–513.

The present invention may be advantageously incorporated in an automatic telephone system wherein common control circuits are employed to control the establishment of calls through a switching network. One such system is disclosed in the J. W. Gooderham et al., U.S. Pat. No. 2,868,884 issued Jan. 13, 1959. It is to be understood, however, that the present invention is not limited to use in a telephone system of this type but may be utilized in other types of switching systems.

The invention is described herein as being embodied in a telephone system of the type disclosed in the cited Gooderham et al. patent. The invention is particularly concerned with apparatus in the switching network comprising incoming link frames 0 through 8, midswitch frames 9 through 17, outlink frames 18 through 26, the apparatus contained in the connectors associated therewith, and the specific interrelationship of the aforesaid frames with each other and with the common control marker circuits 27 through 38. The specific circuitry contained within certain components of the embodiment, such as the circuitry contained within marker circuits 27 through 38, are neither disclosed nor described herein in detail except where necessary for a complete understanding of the invention. Where more detailed information is desired, the earlier cited Gooderham et al. patent may be consulted.

DESCRIPTION OF THE EMBODIMENT

The interrelationship and the function of the equipment units of the exemplary embodiment will now be described generally with reference to FIGS. 1 through 5, wherein the interconnections of circuit blocks has been designated by arrows to show the direction of circuit action.

As noted earlier herein, the switching system of the embodiment is arranged as set forth in the cited Gooderham et al. patent; namely, a switching system of the toll-switching type which provides trunk-to-trunk connections through a switching network. Thus, in a manner set forth in the Gooderham et al., disclosure, an incoming trunk circuit, such as incoming trunk 106, upon being enabled in a calling office will provide information to the switching system of the instant embodiment to thereby cause extension of the communication path from incoming trunk 106 through the switching network to an outgoing trunk such as outgoing trunk 410.

Except as noted hereinafter, it is intended that the switching system of the instant embodiment will be identical to that set forth in the Gooderham et al., patent. Thus, an examination of FIGS. 1 through 5 will reveal that contrary to the Gooderham et al. teaching, the network of the instant embodiment provides an additional stage of switching; namely, the apparatus contained on midswitch frames 9 through 17. As earlier noted herein, the provision of an additional, or fifth stage, of switches renders it possible to provide a switching network of greater capacity than the four-stage switching network taught in the Gooderham et al. patent and conventionally provided in the prior art.

To simplify the instant disclosure, the crossbar switches which are shown on the various incoming link frames, midswitch frames, and outlink frames have been selected as 3 by 3 crossbar switches. More specifically, each such switch is intended to be a crossbar switch of the conventional type well known in the art. Thus, each switch comprises three horizontal levels and three vertical levels wherein any one of the horizontal levels may be connected to any of the vertical levels by the electromechanical closure of the appropriate cross-point of the switch.

Figure 1:
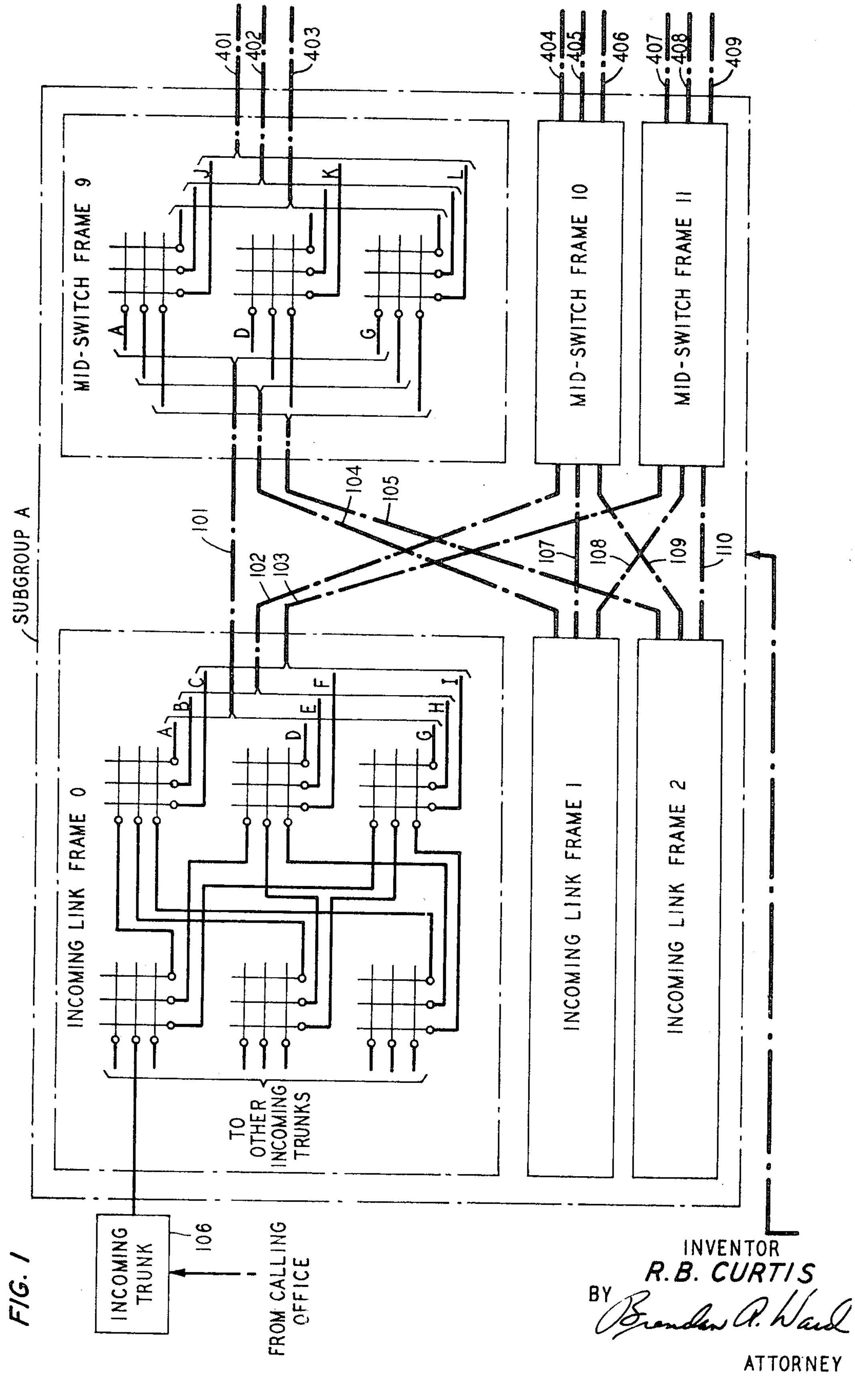
FIGS. 1, 2, 3, 4, 5, and 6 show the overall 5-stage switching network and the relationship of the network to the common control marker circuits.

Referring now to FIG. 1, it will be noted that incoming trunk 106 is terminated on the horizontal level of the upper left-hand switch of incoming link frame 0. In similar fashion, on FIG. 4 outgoing link trunk 410 is shown as terminated on the upper horizontal level of the upper right-hand switch of outlink frame 18. The various verticals of the crossbar switches on the incoming link frames, such as incoming link frame 0, are extended via links to the horizontal levels of the crossbar switches on the right-hand side of the incoming link frames in a standard grid distribution in a manner well known in the art. In similar fashion, the verticals of the crossbar switches on the right-hand side of the outlink frames, such as outlink frame 18, are also similarly extended by links to equivalent horizontals of the crossbar switches on the left-hand side of the outlink frames. Thus, it will be noted that any incoming trunk appearing on an incoming link frame, such as incoming link frame 0, may be extended via cross-point closure to any of the verticals on the switches on the right-hand side of the same frame. In identical fashion, any of the outgoing trunks appearing on the horizontals of the outlink frames may be extended by cross-point closure to any of the vertical units on the left-hand side of the same outlink frame.

An examination of FIG. 1 will reveal that the conductors which extend from the incoming link frames to the midswitch frames are distributed in a precise manner. Thus, the leads designated A, D, and G which extend from the verticals of the switches on the right-hand side of incoming link frame 0 are extended via junctor cable 101 to the correspondingly designated horizontal levels of the crossbar switches on midswitch frame 9. In similar fashion, the conductors designated B, E, and H and those designated C, F, and I are extended via junctor cables 102 and 103 to midswitch frames 10 and 11, respectively, and are terminated thereon in a manner identical to that described above for midswitch frame 9.

Thus, it will be obvious from the foregoing that incoming link frame 0 is provided with access via the junctors contained in cables 101, 102, and 103 to the crossbar switches which are mounted upon midswitch frames 9, 10, and 11. As will be apparent from inspection of FIG. 1, incoming link frames 1 and 2 are similarly provided with access to midswitch frame 9 via the junctor cables respectively designated 104 and 105. In similar fashion, junctor cables 107, 108, 109, and 110 provide interconnection between the switches on incoming link frames 1 and 2 and midswitch frames 10 and 11.

Figure 2:
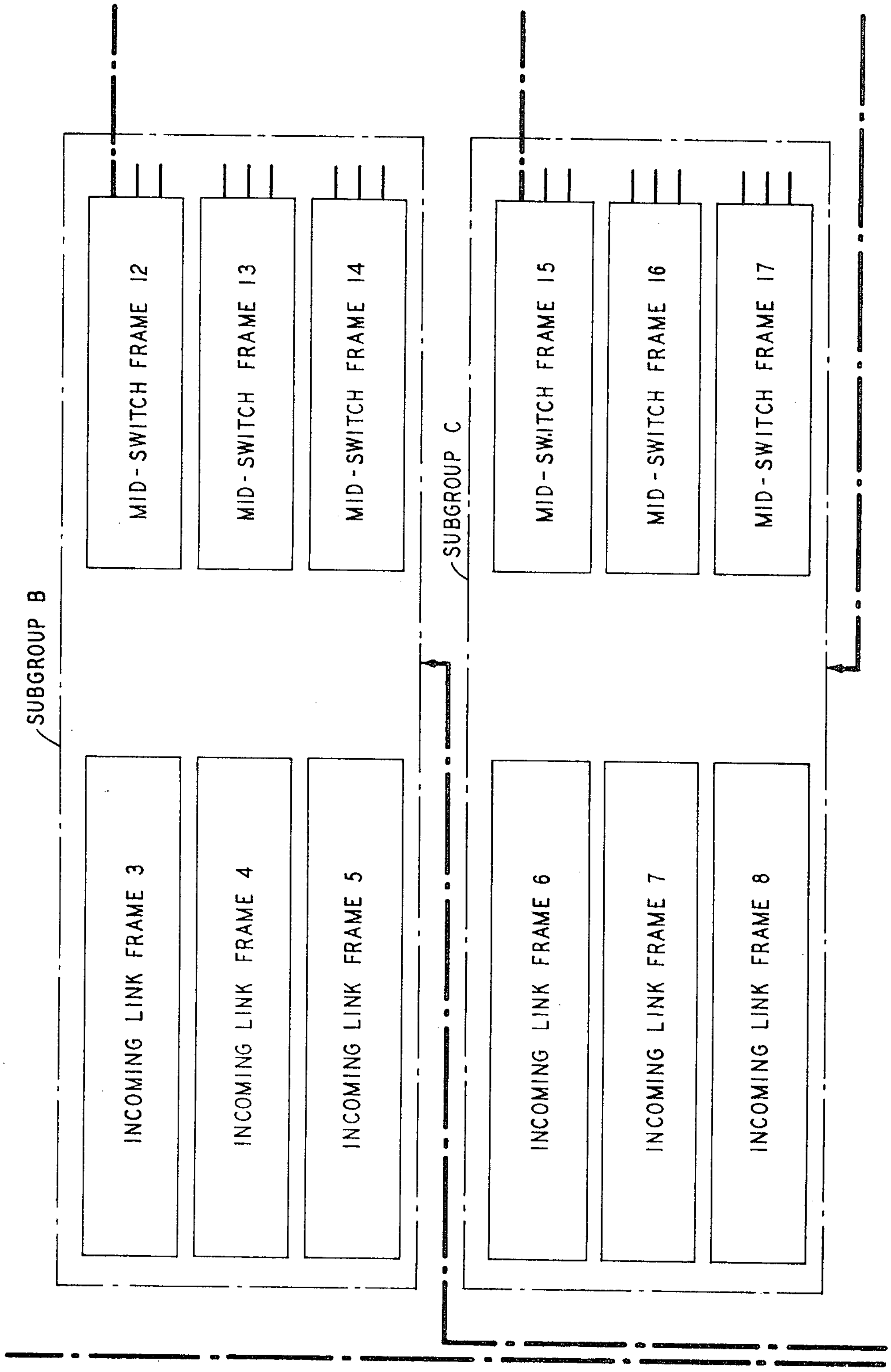

Summarizing at this time, subgroup A of FIG. 1 comprises incoming link frames 0, 1, 2, and midswitch frames 9, 10, and 11. This subgroup of switching frames provides terminations for incoming trunks from calling offices. The switching frames within the subgroup are arranged in a grid network capable of extending connections through the respective switches on the frames, but only within the frames contained in the same subgroup. Subgroups B and C, which are shown on FIG. 2, are similarly arranged, and in an identical manner provide access only between the incoming link frames and the midswitch frames which are contained in the same subgroup.

Figure 4:
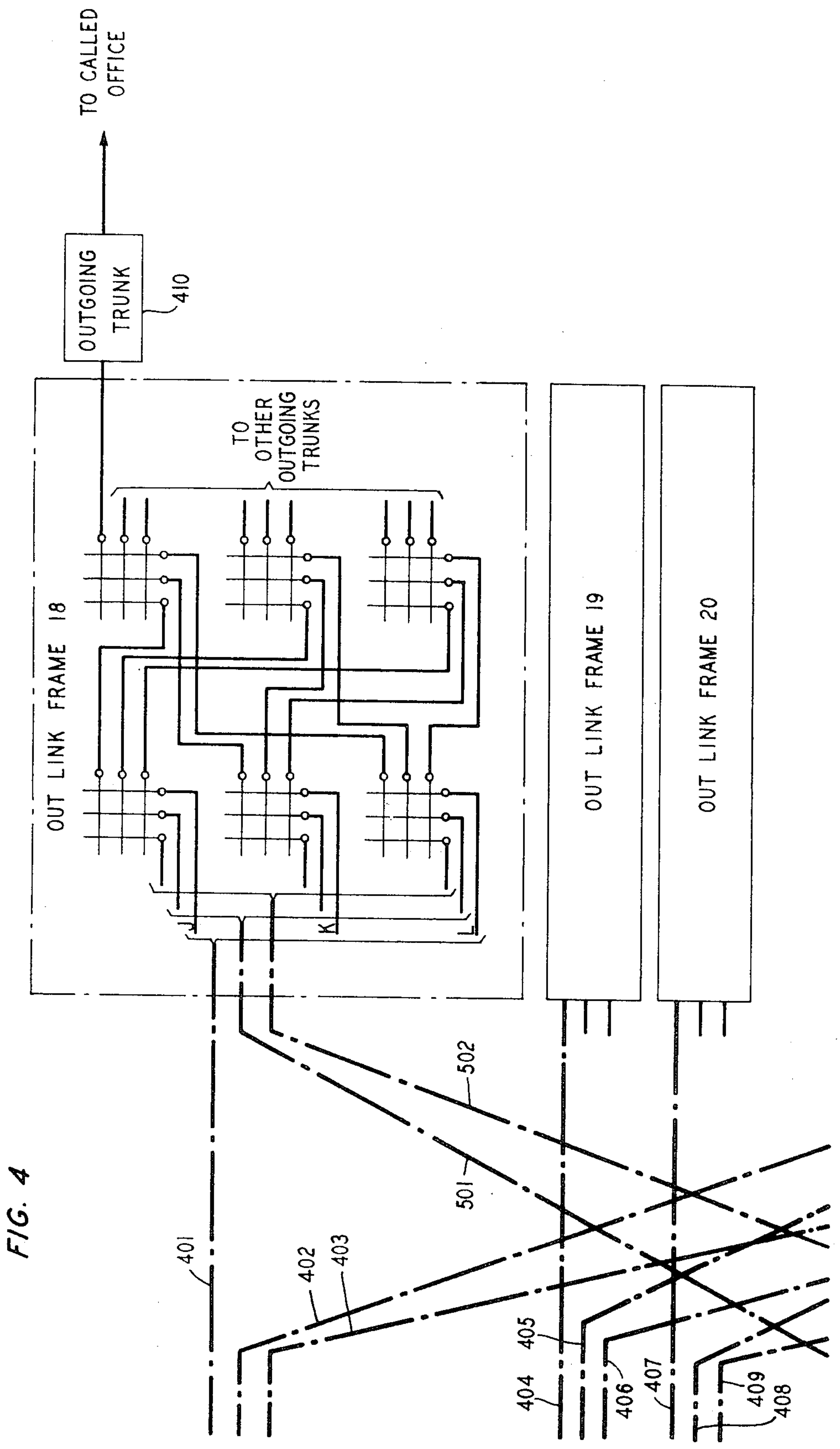
Figure 11:
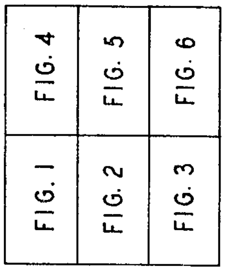
FIGS. 9 and 11 show the manner in which the other FIGS. should be arranged.
Figure 5:
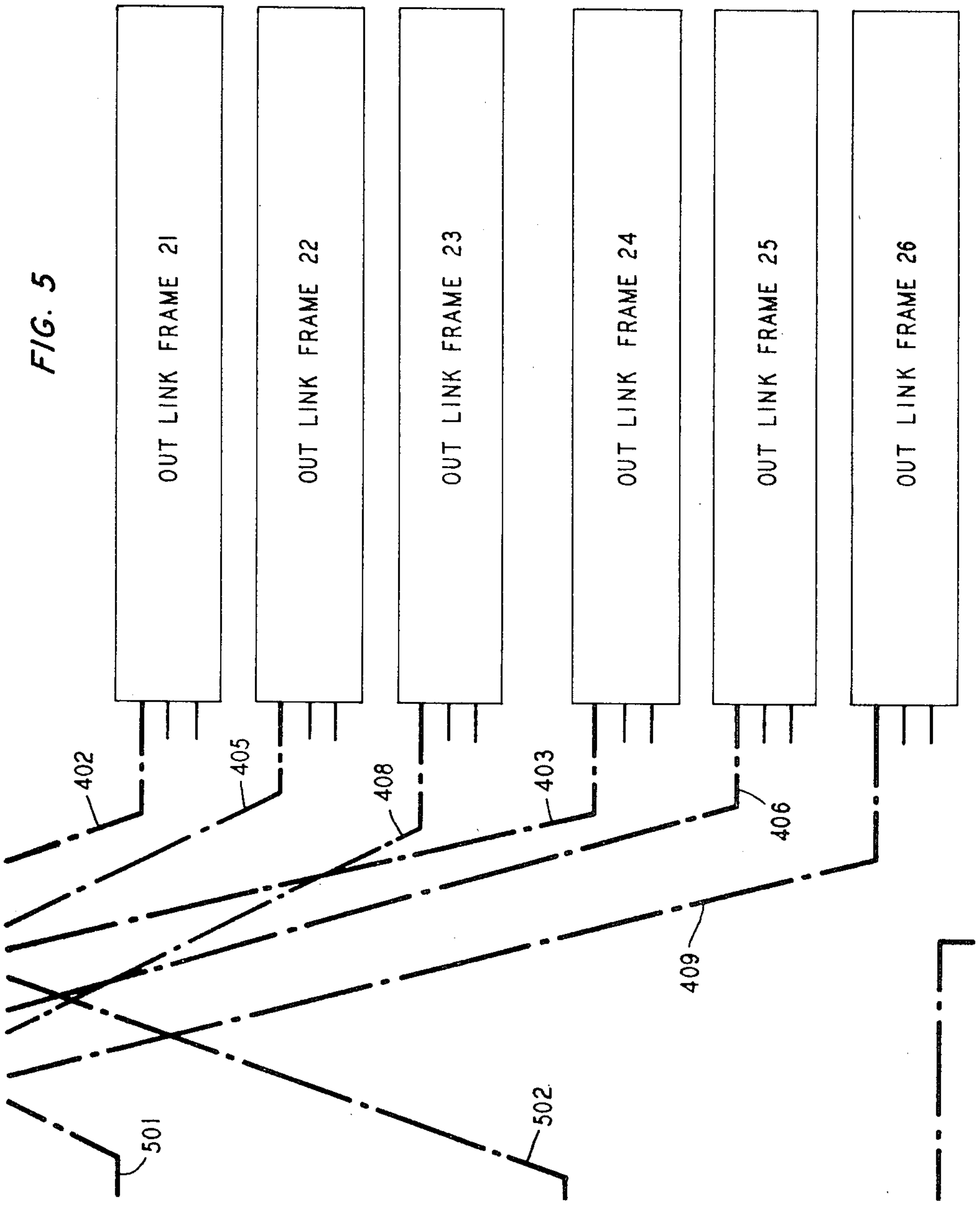
Figure 6:
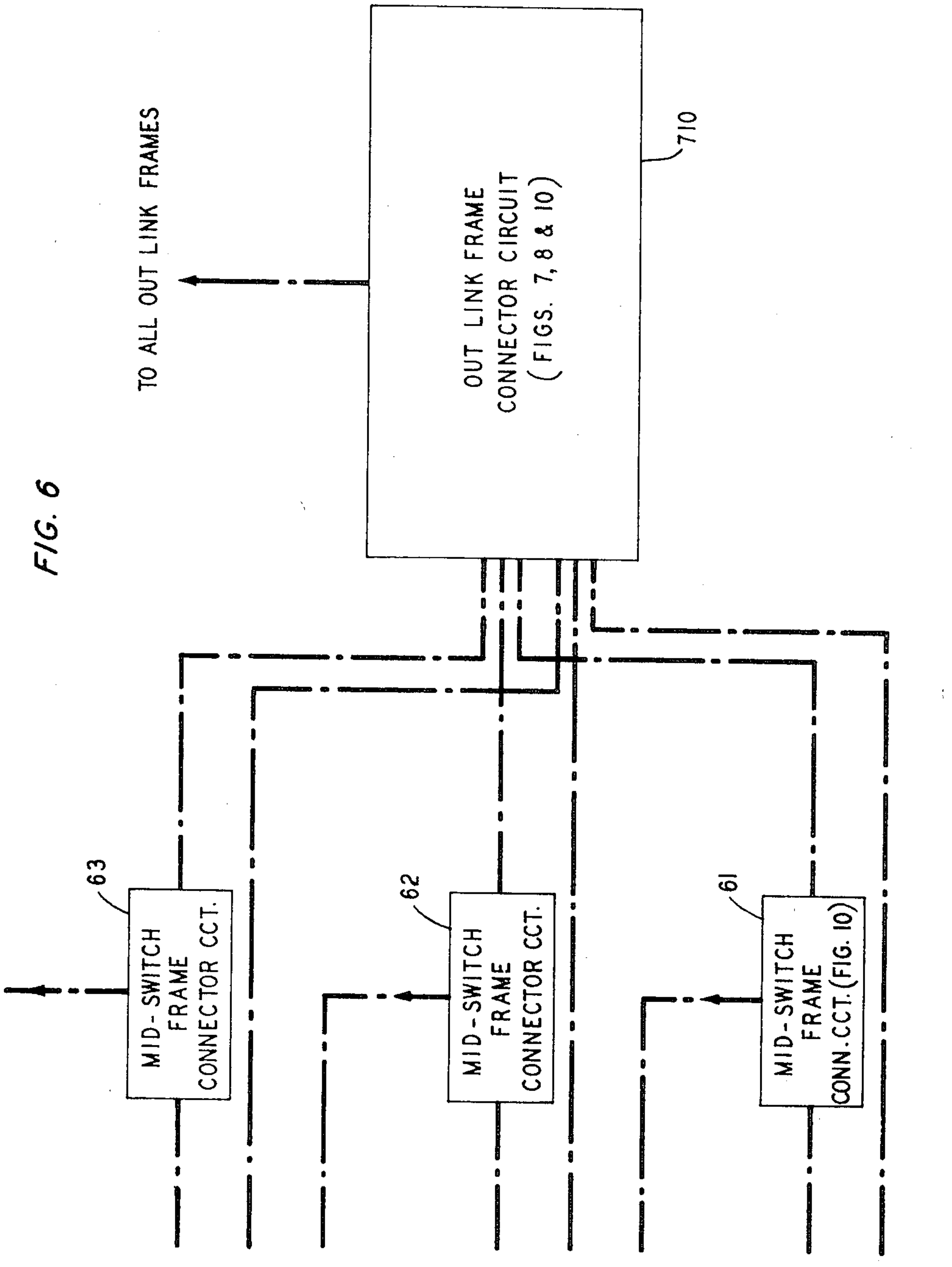

Referring now to FIGS. 4 and 5, junctor cable 401 extends leads J, K, and L, which respectively connect to a vertical on each of the switches on midswitch frame 9, to the correspondingly designated leads of outlink frame 18, where they are terminated on a vertical on each of the left-hand switches of outlink frame 18. In similar fashion, junctor cables 402 and 403 extend the conductors from the remaining vertical units on the switches of midswitch frame 9 to out link frames 21 and 24, respectively. Junctor cables 501 and 502 extend conductors from the vertical units of outlink frame 18 to the vertical units of midswitch frames 12 and 15 in switching frame subgroups B and C, respectively. Junctor cables 404, 405, 406, 407, 408, and 409 complete the distribution pattern for the vertical units of the midswitch frames of subgroup A in a manner identical to that above described.

Summarizing at this time, it will be apparent that the above-described grid network provides for a division of the first three stages of a 5-stage switching network into respective subgroups each comprising an equal number of switching frames. Thus, the illustrative embodiment provides nine incoming link frames each comprising two switching stages and nine midswitch frames each comprising a single switching stage and wherein each of the subgroups comprises a total of three incoming link frames arranged in a grid network with respect to three midswitch frames. Junctor access is provided only between incoming link frames and midswitch frames within the same subgroup. However, junctor access from each subgroup is distributed over the nine outlink frames of the switching network, each of which comprises the final two stages of switching.

Thus, all of the switching paths from a terminal on an incoming link frame in any of the subgroups of frames must extend through one of the three midswitch frames in the same subgroup. By way of further example, it is obvious that all paths from a terminal on incoming link frame 0 to a terminal on outlink frame 18 must go through midswitch frame 9.

Figure 3:
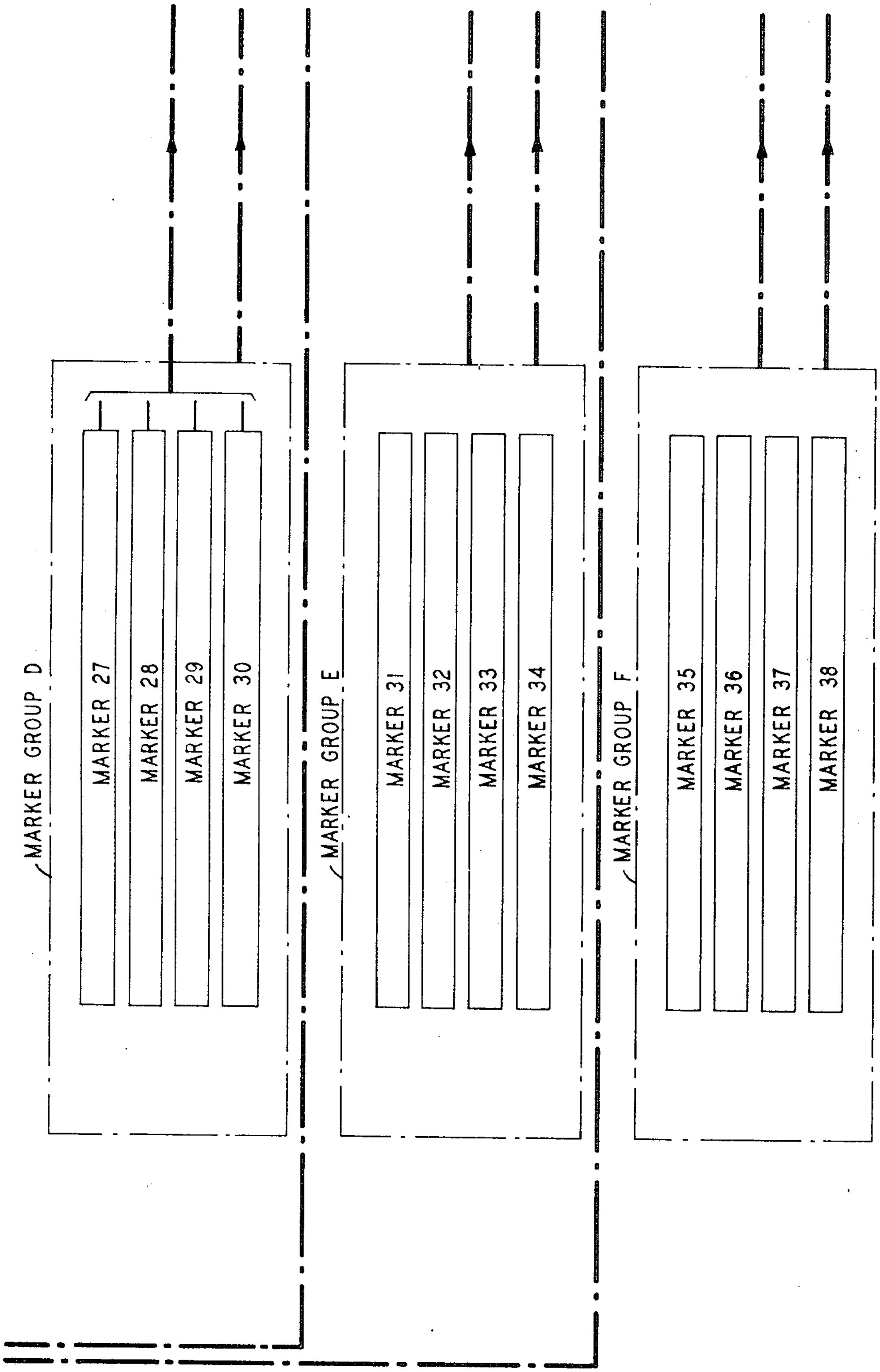

An examination of FIG. 3 will reveal that the 12 markers which are provided in the instant embodiment, namely markers 27 through 38, are divided into groups of four markers each, respectively designated marker groups D, E, and F. In the illustrative embodiment it is intended that the respective marker groups will serve respective subgroups of incoming link frames and midswitch frames. Thus, as shown in block form in FIGS. 1, 2, and 3, marker group D serves switching frame subgroup C; marker group E serves switching frame subgroup B; and marker group F serves switching frame subgroup A.

From the foregoing it is apparent that the connector apparatus necessary to provide marker access to the switching frames of the network is substantially reduced by arranging the switching network in the manner above described in conjunction with arranging the marker circuits in groups to respectively serve various subgroups of switching frames. From that which is contained hereinafter, it will be apparent that required connector apparatus is further minimized by the provision of a 2-stage connector wherein access to the outlink frames is provided under control of the same connector which provided access to a midswitch frame. It will also be obvious from that which is contained hereinafter that the switching network may be increased to the commonly used 100 point and 200 point crossbar switch arrangement, and may be further extended in accordance with traffic considerations in a manner identical to that set forth herein to a 100 by 100 frame network.

2-STAGE CONNECTOR

As earlier disclosed herein and as well known in the art, during the establishment of a communication path through the switching network, it is necessary for the various marker circuits to seize certain switching frames. Seizure is accomplished by closing through various test leads from the switch frame through a connector circuit to the associated marker to permit testing of the various elements of the required linkage path prior to selection and enabling of the path. As earlier described, it is intended that the connector arrangement which exists between the incoming link and midswitch frames and the respective markers be of the conventional type, wherein the markers and the respective frames are arranged in a matrix with a connector relay at each point of intersection of the matrix. Thus, for example as shown on FIGS. 2 and 3, each of the markers in marker group D, comprising markers 27 through 30, is arranged with connector relays operable to permit selection of each of the incoming link frames in subgroup C and each of the mid-switch frames in subgroup C as required. In view of the fact that such connector arrangements are well known in the art, they will not be set forth in detail herein except where directly related to the instant embodiment and thus necessary for a complete understanding of the invention.

Referring now to FIGS. 7 and 8, outlink frame connector circuit 710 is shown thereon as providing access between each of the markers in groups D, E, and F to all of the outlink frames of the embodiment. This provision of access from any marker to any outlink frame distinguishes over the arrangement which exists between the markers and the other frames of the network in that, as earlier noted, the incoming link frames and the midswitch frame subgroups are served by respective marker groups. Proceeding now with the description, although only a single make contact is shown within the various lockout circuit blocks on FIGS. 7 and 8, it is intended that the single make contact is symbolically representative of a plurality of make contacts associated with each connector relay as required to extend a plurality of leads between a particular marker and a particular outlink frame. Thus, for example, each of the lockout circuits 701 through 709 is provided with one connector relay per marker each of which is arranged in a lockout circuit.

Referring now to FIG. 8, each of the lockout circuits 801 through 809 is provided with a connector relay per marker group each of which is also arranged to a lockout circuit. From an inspection of FIGS. 7 and 8, it will be apparent that while marker 35 is operating with outlink frame 18, markers 36, 37, and 38 cannot be associated with outlink frames 18, 21, and 24. This is true because the operation of connector relay 10CA35A prevents (or locks out) the operation of any of the other connector relays in lockout circuit 703. However, during this time, markers 36, 37, and 38 can operate with the remaining outlink frames 19, 20, 22, 23, 25, and 26.

The connector arrangement for marker groups E and D are similarly arranged. Thus, for example, marker 35 in group F upon operation of its associated connector relay 10CA35A is able to seize outlink frame 18 unless prior selection of outlink frame 18 has taken place by a marker in groups D or E as manifested by a previously operated 10CBEl or 10CBDl connector relay in lockout circuit 801.

Referring now to FIGS. 1 and 4, we shall assume that incoming trunk 106 has been enabled in the calling office and that the information received by marker 35 in marker group F indicates the need for connection through the switching network to out going trunk 410. The specific manner in which this information is received and translated is set forth in detail in the earlier cited Gooderham et al., patent and therefore will not be repeated herein. However, it will be noted that all of the linkage paths which extend from incoming link frame 0 to outlink frames 18, 21, and 24, pass through midswitch frame 9. Thus, upon seizure of midswitch frame 9 the remaining markers in marker group F are locked out from selection of this particular frame, thereby concurrently preventing the selection of a path involving outlink frames 18, 21, and 24 by markers 36 through 38 during the period that marker 35 is establishing the present connection.

Referring now to FIG. 10, we have assumed that marker 35 is in the process of establishing a connection through to out going trunk 410 and therefore requires a selection of midswitch frame 9 and outlink frame 18. Upon ascertaining that selection of midswitch frame 9 is required, in a manner well known in the art marker 35 extends battery potential on the MP35 lead through the winding of the 10MP35 relay to ground present on released break contact 2 of relay 10MP38. Relay 10MP35 thereupon operates. The enabling of associated transfer contact 3 of the 10MP35 relay provides ground to the right side of connector relay 10C35-9. Connector relay 10C35-9 operates and remains operated under control of battery potential provided on the C35 lead from marker 35. It will be noted that other 10MP relays operating at this time will not result in the operation of the associated 10C-- relay since the ground necessary for the operation of these latter relays are interrupted because of the enabled state of break contact 3 on relay 10MP35. Accordingly, at this time, the make contacts of connector relay 10C35-9 as symbolically represented by make contact 4 of the 10C35-9 relay, extends a plurality of leads from midswitch frame 9 through to marker 35 to permit testing and selection of the necessary linkage elements on midswitch frame 9.

The placing of ground upon the right side of the winding of the 10C35-9 relay, as above described, results in completion of the obvious operate path of the relay 10CA35A in outlink frame connector circuit 710. This relay, which as earlier described and as shown on FIG. 7, extends the necessary leads from marker 35 through to lockout circuit 801 which ultimately extends to outlink frame 18. Since we have assumed that marker 35 requires the selection of outlink frame 18 at this time, battery is extended in a manner well known in the art, via the MPF lead to outlink frame connector circuit 710 to complete the obvious operate path of relay 10MPF1 at this time. The enabling of make contact 2 of relay 10MPF1 extends ground through a chain of transfer contacts on the 10MPD1 and 10MPE1 relays, through the winding of the 10CBF1 relay from outlink frame connector circuit 710 to battery present on the CBF1 lead from marker 35. Accordingly, relay 10CBF1 operates at this time and remains operated under control of marker 35.

Referring now to FIG. 8, the enabling of connector relay 10CBF1 closes the associated make contacts as shown in lockout circuit 801 thereby extending the necessary control and test leads from outlink frame 18 through to marker 35. Marker selection may thereupon proceed in a manner well known in the art, and as fully set forth in the Gooderham et al., patent, thus resulting in the closure of the necessary crosspoints on incoming link frame 0, midswitch frame 9 and outlink frame 18, thereby interconnecting incoming trunk 106 and outgoing trunk 410 so that the calling connection may be completed. Upon completing its function, marker 35 releases and in a manner well known in the art restores the connector relays to normal thereby permitting reseizure of any of the aforesaid frames in a manner identical to that hereinbefore described.

SUMMARY

From the foregoing it is apparent that a switching network of substantial capacity may be provided economically by application of the principles of my invention. To further highlight the improvement over prior art arrangements it is to be noted that by employing prior art techniques a total of 324 marker-to-switch-frame connector relays would be required in the system of the embodiment; viz: 12 Markers × 9 Incoming Link Frames = 108, 12 Markers × 9 Midswitch Frames = 108, and 12 Markers = 9 Outlink Frames = 108. However, as shown in the drawing, by employing the principles of my invention only 135 such connectors are required; viz: 4 Markers per subgroups of Incoming Link Frames × 3 Incoming Link Frames per subgroup × 3 Subgroups = 36, 4 Markers per subgroups of Midswitch Frames × 3 Midswitch Frames per subgroup × 3 Subgroups = 36, 12 Markers × 3 Outlink Frame Groups = 36, and 3 Connector Relays × 9 Outlink Frames = 27. Application of the principles of my invention to switching networks of larger size than that set forth in the embodiment also results in equivalent reduction of the connector apparatus otherwise required.

It will also be noted by reference to FIGS. 1 through 5 that insertion of the switching stage contained in the midswitch frames may be readily accomplished in existing working four stage networks by placement in parallel of the associated junctors with respect to existing junctors prior to cutover to the use of the full 5-stage network.

Although the embodiment of my invention discloses a telephone toll-switching center comprising five stages of switching in the switching network wherein a 2-stage connector arrangement is provided between the common control marker circuits and the last two stages of switching in the network, it is obvious that numerous other arrangements may be devised by those skilled in the art without departing from the spirit and scope of my invention.

For example, my invention may be applied to switching networks comprising a greater or lesser number of switching stages than that set forth in the embodiment.

By way of further example, the principles of my invention may be embodied in any switching network irrespective of the type of equipment which is interconnected through said network.

What is claimed is:

1. In a switching system,
a switching network comprising
a plurality of subgroups of primary switch frames,
a plurality of subgroups of secondary switch frames, a group of tertiary switch frames, first junctor means connecting
each of said subgroups of primary switch frames to an exclusive one of said subgroups of secondary switch frames,
second junctor means connecting each of said subgroups of secondary switch frames to all of said tertiary switch frames, and
a plurality of control means arranged in groups and operable for controlling associated parts of said network to complete connecting paths through said network wherein each said group of control means is exclusively associated only with a subgroup of primary frames, a subgroup of secondary frames and the tertiary frames which are interconnected with each other by said junctor means.

2. In a switching system, the combination set forth in claim 1 wherein
said primary switch frames each comprise a first stage and a second stage of switches and link means interconnecting said first and said second stage switches in a grid network,
said secondary switch frames each comprise a third stage of switches, and
said tertiary switch frames each comprise a fourth stage and a fifth stage of switches and link means interconnecting said fourth and said fifth stage switches in a grid network.

3. In a switching system, the combination set forth in claim 1 wherein said primary switch frames, said secondary switch frames, and said tertiary switch frames each comprise a plurality of crossbar switches.

4. In a switching system, the combination set forth in claim 1 further comprising means for interconnecting any said control means with any said tertiary frame comprising a connector relay per control means and a connector relay per group of control means per tertiary frame.

5. In a communications system, a switching network comprising
a plurality of subgroups of primary switch frames each exclusively terminating certain communication circuits,
a plurality of subgroups of secondary switch frames,
a group of tertiary switch frames each exclusively terminating other communication circuits,
first junctor means connecting each said subgroup of primary switch frames to an exclusive one of said subgroups of secondary switch frames,
second junctor means connecting each said subgroup of secondary switch frames to all of said tertiary switch frames, a plurality of control means arranged in groups,
each said control means operable for controlling switch frames connectable thereto to complete a connecting path through said network between a said certain communication circuit and a said other communication circuit,
means for exclusively connecting an individual said control means within a particular said group of control means only with a primary frame and a secondary frame which are in subgroups interconnected with each other by said first junctor means, and
means for exclusively connecting any said control means with any said tertiary frame.

6. In a communications system
the combination set forth in claim 5 wherein each said primary switch frame comprises serially connected first and second stages of crossbar switches forming a grid network,
each said tertiary switch frame comprises serially connected fourth and fifth stages of crossbar switches forming a grid network, and
each said secondary switch frame comprises a third stage of crossbar switches serially connected to said second stage via said first junctor means and serially connected to said fourth stage via said second junctor means.

7. In a communications system, a five-stage switching network comprising a plurality of subgroups of primary switch frames each comprising serially connected first and second stages of crossbar switches, a plurality of subgroups of secondary switch frames each comprising a third stage of crossbar switches, a group of tertiary switch frames each comprising serially connected fourth and fifth stages of crossbar switches, first junctor means connecting the said second stage of each of said subgroups of primary switch frames to the said third stage of an exclusive one of said subgroups of secondary switch frames, second junctor means connecting the said third stage of each of said subgroups of secondary switch frames to said fourth stages of all said tertiary switch frames, a plurality of control means arranged in groups and operable to enable connecting paths through the said five stages of said network, first connector means for exclusively connecting each said group of control means with a predetermined said subgroup of primary switch frames and a predetermined said subgroup of secondary switch frames which are interconnected with each other by said first junctor means, and second connector means for exclusively connecting each said control means with any said tertiary switch frame.

8. In a communications system, the combination set forth in claim 7 wherein said first connector means comprises a connector relay per control means per switch frame.

9. In a communications system, the combination set forth in claim 7 wherein said second connector means comprises a connector relay per control means and a connector relay per group of control means per tertiary switch frame.

10. In a communications system, the combination set forth in claim 9 wherein said control means and said first connector means comprise means for enabling said second connector means.

11. In a communications system, the combination set forth in claim 9 wherein each said connector relay per control means is arranged in a lockout circuit effective only among the said connector relays serving the control means within the same said group.

12. In a communications system, the combination set forth in claim 9 wherein each said connector relay per group of control means per tertiary frame is arranged in a lockout circuit effective only among the said connector relays serving the same tertiary frame.

* * * * *